Aug. 10, 1943.  E. PIQUEREZ  2,326,169
FLUID DELIVERY METER
Filed March 6, 1939
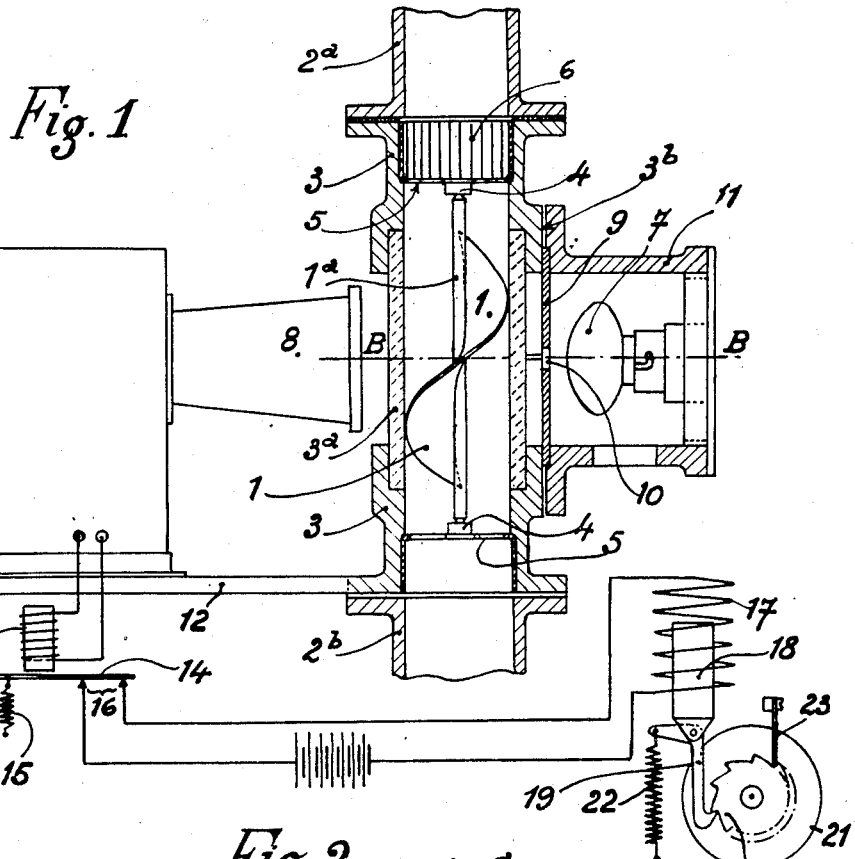
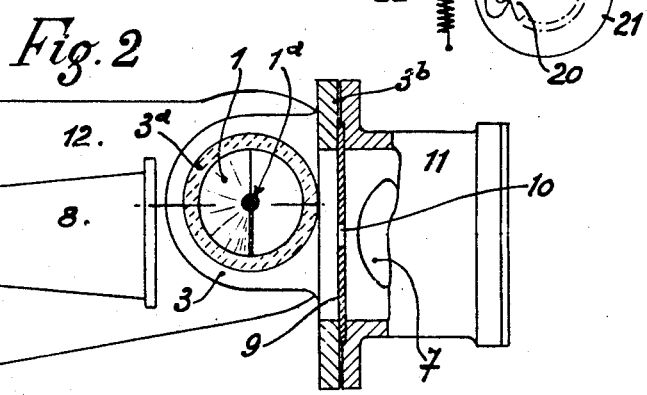
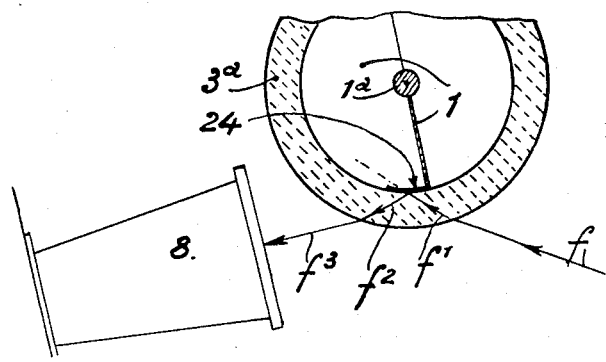
Inventor
Emile Piquerez
By Sommers & Young
Att'ys Patented Aug. 10, 1943

2,326,169

UNITED STATES PATENT OFFICE 2,326,169

FLUID DELIVERY METER

Emile Piquerez, Saint-Cloud, France; vested in the Alien Property Custodian

Application March 6, 1939, Serial No. 260,164
In France March 24, 1938

3 Claims. (Cl. 73—231)

The present invention relates to fluid delivery meters or counters of the continuous type, in which the metering member is a rotor arranged in, and operated by, the liquid current.

It is known that known apparatus of this kind, whether of the purely mechanical type, of the electro-mechanical type or of the magnetic type, have the general inconvenience of having a reduced sensitiveness, in consequence of the braking action applied to the rotation of the turbine by the device which indicates the volumes as a function of the number of revolutions of the rotor.

The present invention has for its object to provide a novel meter of the turbine type which radically eliminates this inconvenience, and which consequently possesses a maximum sensitiveness limited only by the minimum pivoting friction of the turbine.

To this end, the invention is essentially characterized by the use, in order to control the indicator, of a photo-electric cell and of a luminous pencil constructed so as, alternatively, to illuminate the cell and to be cut off at a frequency depending on the speed of rotation of the turbine under the action of the fluid current.

The output of the amplifier of the photo-electric cell is connected to a relay which, at each cutting off phase, according to the arrangement chosen, closes the feeding contact of an electromagnet controlling the base wheel of a counter.

In a particularly simple embodiment, the apparatus comprises a turbine, which is co-axial with the fluid conduit and is of the helicoidal type turning in a glass cage. The luminous pencil is established across the interval comprised between the hub of the turbine and the said cage by means of a source of light external to the latter. The photo-electric cell is arranged on the opposite side of the cage in a suitable position, account being taken of the refractions of the luminous rays through the cage and also through the flowing liquid. The said luminous pencil is cut off at the passage of each spiral, that is to say, a number of times per revolution of the turbine equal to the number of spirals of the latter.

In the case of an opaque fluid, a turbine rotating in a glass cage can still be used with a luminous pencil, which is arranged in such a manner as normally to be cut off by the mass of the said fluid but, at the time of the passage of a spiral or blade of the turbine, to be directed towards the photo-electric cell by means of a small reflecting surface integral with the spiral or blade and rotating in close contact with the internal cylindrical wall of the cage.

The annexed drawing shows, by way of example, one embodiment of the invention.

Fig. 1 shows the complete apparatus, partly diagrammatically and partly in sectional elevation;

Fig. 2 is a fragmentary plan view partly in section, at the level of the line B—B in Fig. 1; and Fig. 3 is a partial and diagrammatic plan view of a modification of the preceding construction for use in the case of an opaque fluid.

Referring to the drawing, the apparatus comprises a turbine 1, of the axial type, for example, and consequently mounted on the axis of the fluid conduit $2^a$, $2^b$. The turbine is supported in a tubular casing 3 inserted between the two sections $2^a$, $2^b$ of the conduit. The diameter of the turbine 1 is substantially the same, that is, only slightly smaller than the inner diameter of the tubular casing 3 in which it is located. The ends of the shaft $1^a$ of the turbine forming pivots are advantageously carried, in the usual manner of clock-work pivots, in stones housed at 4, 4 on pierced supports, 5, 5 in the interior of the casing 3, so as to reduce friction to a minimum.

In the present construction, the turbine comprises a single spiral which rotates without play in the internal conduit of the casing 3, the part of the latter housing the turbine consisting of a glass tube $3^a$, hermetically encased at its ends in two metallic parts 3, 3 joined in a fluid-tight manner, in any suitable way, with the two sections $2^a$, $2^b$ of the fluid conduit.

In the inlet of the turbine there is advantageously disposed a fluid current corrector or breaker-jet 6 which, in case the apparatus is connected in the conduit at a position immediately following a bend in the conduit, will cause the fluid stream to flow parallel to the axis of the turbine.

The space between the shaft or hub $1^a$ of the turbine and the internal wall of the glass case $3^a$ is traversed by a liuminous pencil from a lamp 7, arranged to illuminate a photo-electric cell intermittently in dependence on the delivery of fluid through the turbine, that is to say, in accordance with the speed of rotation of the turbine and as a function of the number of spirals of the latter. In the present construction, in which the turbine comprises a single spiral only, the luminous pencil will thus be cut off once per revolution and, in this connection, it will be noticed that the number of spirals of the turbine is only limited by the condition that the luminous pencil should only meet a single spiral at a time. The whole of the photo-electric cell with its accessories (amplifier) represented diagrammatically is designated by 8 on the drawing. The luminous pencil advantageously is limited by means of a wall 9 provided with an opening 10 or concentrated by means of an optical condenser.

In Fig. 2 the axis of the luminous source will not ordinarily be aligned with the axis of the receiving cell but these two members are disposed one with respect to the other so as to take into account the refraction of the light through the glass of the tube $3^a$ and, eventually, by the fluid which flows into the conduit.

The lamp 7 is mounted in a support 11 which is fixed, for example, against a plane face, in the form of a ring $3^b$ on the side of the metallic parts 3 of the casing of the turbine, and maintains the wall 9 in position at the same time.

The cell and its accessories can be mounted, for example, on a seat 12 integral with the lower member 3 of the casing.

The apparatus as just described is closed in a light-tight casing (not shown), which prevents the action on the cell of daylight or any other source but the lamp 7.

The current furnished by the photo-electric cell is duly amplified and feeds a relay 13 which itself serves to feed the counter-mechanism proper at the time of the cutting off. In the drawing, the parts are shown as being arranged to operate to advance the counter each time the luminous pencil is cut off. When the current from the photo-electric cell mechanism 8 ceases, the relay 13 releases its armature 14 which, under the action of a return spring 15, bridges contacts 16 and closes a circuit by which an electro-magnet or a solenoid controlling the counter is energized. The illustrated example of the circuit comprises a solenoid 17 having a plunger core 18, which is articulated to a click 19 adapted to operate the base wheel 20 of a drum counter 21. A spring 22 ensures the return of the click 19 and of the core 18 and another click 23, such as a resilient blade, ensures the retention of the base wheel.

It will be understood that in the present case the base wheel advances by one tooth for each revolution of the turbine 1, this corresponding to the passage through the turbine of a predetermined volume of fluid.

The number of teeth of the base wheel and the transmission between the latter and the first graduated drum or the first indicating wheel are naturally established in dependence on the units (litres or others) indicated by the first drum or the first wheel. It will be understood that the measurement for a pipe of given diameter will be the more precise as the delivery corresponding to an operation of the counter is smaller, the maximum precision being obtained by providing the turbine with a maximum number of spirals compatible with the observance of the condition indicated above, that is to say, that the luminous pencil shall never encounter more than one spiral at a time.

In the case of the metering of the delivery of an opaque fluid, apparatus of the same kind as the preceding can be used but with a different relative arrangement of the luminous source and the photo-electric cell. In this case, the luminous pencil $f$, Fig. 3, refracted at $f^1$, will be made in such a manner as to be cut off normally by the mass of the opaque fluid. Each spiral or blade 1 of the turbine will be provided, however, at the height of the plane of the pencil with a small rim 24 having a reflecting surface which, during the passage of the spiral, encounters the pencil and causes it to pass from $f^2$ to $f^3$ in the direction of the photo-electric cell 8.

It goes without saying that the counter mechanism proper can be arranged either for counting positively or for deducting from a quantity marked in advance by the indicator members.

It will be understood that the invention is not limited to the constructions particularly described and shown, but includes all equivalent modifications.

What I claim is:

1. Apparatus for measuring the quantity of fluid passing through a conduit comprising a substantially cylindrical, transparent tube connected in said conduit and through which the fluid flows, a helical turbine rotatably mounted in said tube coaxially therewith, the diameter of said turbine being substantially the same as the internal diameter of the tube so that the outer edges of the turbine pass close to the inner surface of the tube, said turbine having light-controlling means closely adjacent the transparent tube, an indicator for indicating the quantity of liquid, means for moving said indicator in accordance with the number of rotations of said turbine, said moving means including a source of light directed through the transparent tube into the path of the rotatable turbine eccentric to the axis of said tube and turbine, a light-sensitive electric cell located in position to receive the light from the light source when permitted to pass thereto after refraction by said tube and the fluid, the light-controlling means of said turbine passing in and out of position to vary the light beam to said cell as the turbine rotates, and indicator driving means operated in accordance with the current variations of said light-sensitive cell.

2. Apparatus for measuring the quantity of fluid passing through a conduit comprising a substantially cylindrical, transparent tube connected in said conduit and through which the fluid flows, a helical turbine rotatably mounted in said tube coaxially therewith, the diameter of said turbine being substantially the same as the internal diameter of the tube so that the outer edges of the turbine pass close to the inner surface of the tube, said helical turbine extending through a single turn of the helix so that all portions of the fluid flow contribute equally to the turning of the turbine, said turbine having a light-reflecting surface located close to the inner wall of the transparent tube and during the rotation of the turbine coming periodically into the path of the light to reflect the light to the light-sensitive cell, an indicator for indicating the quantity of liquid, means for moving said indicator in accordance with the number of rotations of said turbine, said moving means including a source of light directed toward the turbine eccentric of the axis, a light-sensitive electric cell located in position to receive the light from the light source when permitted to pass thereto, the light-reflecting surface of said turbine passing in and out of position to vary the light beam to said cell as the turbine rotates, and indicator driving means operated in accordance with the current variations of said light-sensitive cell.

3. Apparatus for accurately measuring the quantity of flowing liquid independently of the pressure of the fluid, comprising a conduit having a section thereof formed of transparent material, a turbine wholly immersed in the liquid in the transparent section of said conduit to be actuated by the liquid in accordance with the quantity of liquid passing through said section, said turbine being free of any mechanical connection outside said conduit which would tend to retard its rotation, a photo-electric cell adjacent one portion of said transparent section, a source of light directed toward the turbine, said turbine having a surface which passes close to the inner surface of the transparent section of the conduit, said surface being light reflective and in operation periodically reflecting the light beam tagentially to the photo-electric cell so as to cause electric current variations therein, and means controlled by said electric current variations for registering the quantity of liquid passing through said conduit.

EMILE PIQUEREZ.